(12) United States Patent
Vega

(10) Patent No.: US 6,601,935 B2
(45) Date of Patent: Aug. 5, 2003

(54) DATA DRIVEN PEN NOZZLE MASKS

(75) Inventor: Ramon Vega, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/918,454

(22) Filed: Aug. 1, 2001

(65) Prior Publication Data

US 2003/0025746 A1 Feb. 6, 2003

(51) Int. Cl.$^7$ .............................. B41J 29/38; B41J 2/205
(52) U.S. Cl. ........................................... 347/12; 347/15
(58) Field of Search ...................... 347/12, 15

(56) References Cited

U.S. PATENT DOCUMENTS

| | | | |
|---|---|---|---|
| 5,414,453 A | * | 5/1995 | Rhoads et al. ................. 347/8 |
| 5,638,098 A | * | 6/1997 | Iwata et al. ..................... 347/9 |
| 6,157,461 A | * | 12/2000 | Doron et al. ................ 358/1.9 |
| 6,158,835 A | * | 12/2000 | Jackson et al. ............... 347/12 |

* cited by examiner

Primary Examiner—Hai Pham
Assistant Examiner—Alfred E. Dudding

(57) ABSTRACT

An apparatus and method for prolonging the life of a print head while printing repeated patterns on a substrate. A repeating pattern to be printed is first analyzed. An algorithm creates at least one set of masks based on the analysis of the repeating pattern. The masks created by the algorithm are used to print subsequent patterns. The algorithm operates to prolong the life of the print head by substantially evenly distributing the number of times each print head is used, and substantially prevents overuse of one nozzle with respect to another.

38 Claims, 14 Drawing Sheets

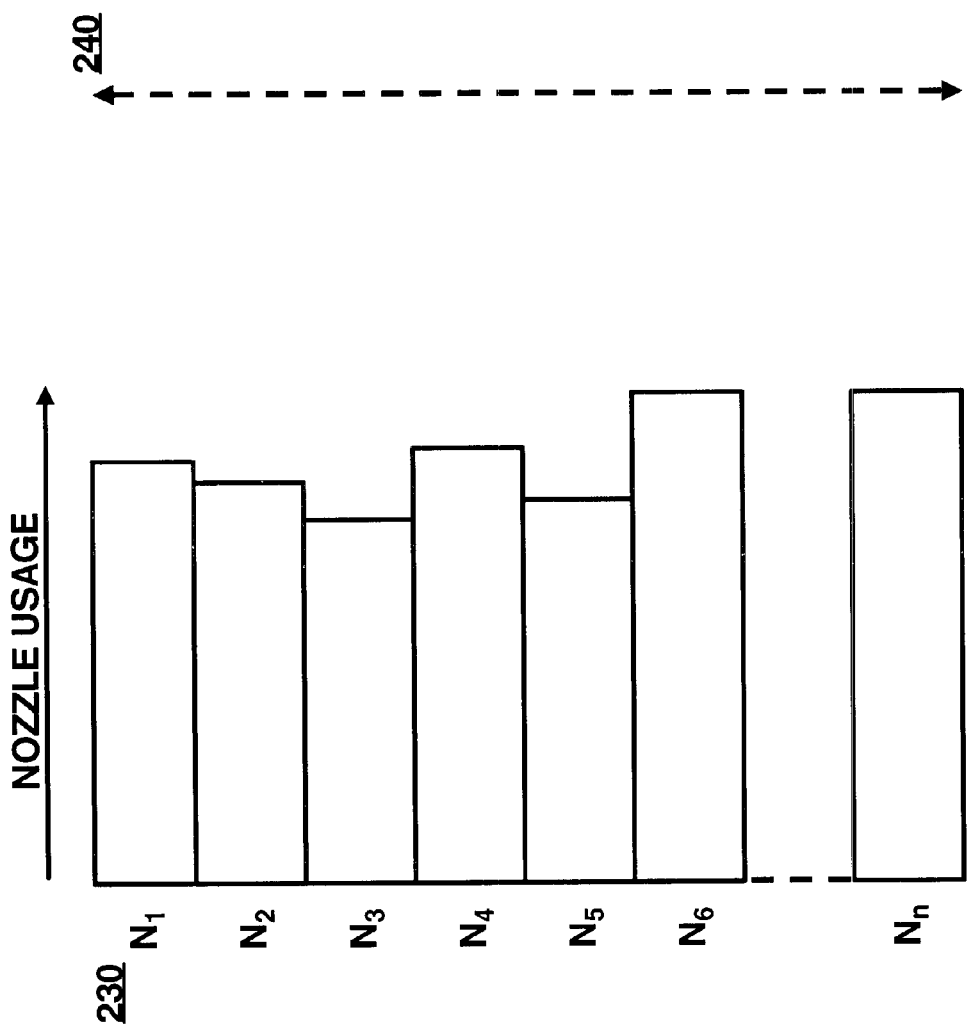

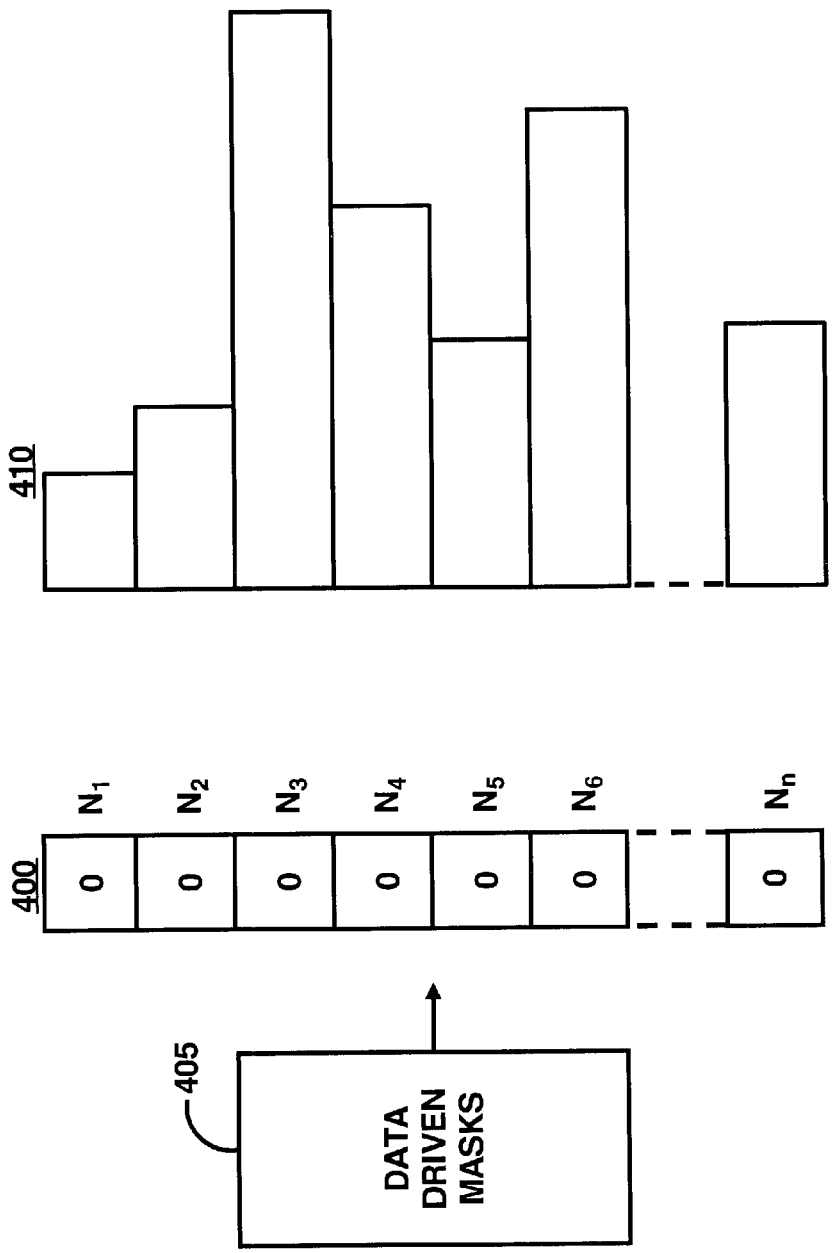

DATA DRIVEN PEN NOZZLE MASKS

FIELD OF THE INVENTION

This invention relates generally to ink jet printers, and more particularly to a technique for generating printer masks that facilitate a substantially even distribution of workload among print head nozzles during the printing of repeated patterns.

BACKGROUND OF THE INVENTION

It is generally known to use ink jet printers in textile printing. A relatively high proportion of printing operations in the textile printing industry include patterns that are repeatedly printed onto a substrate, e.g., fabric, paper, and the like. In printing these patterns, multi-pass printing techniques are typically implemented.

In multipass printing, a print head nozzle array is divided into a plurality of nozzle regions and different parts of the printing output are printed using different nozzle regions. The printing is done in a plurality of printing passes with the different nozzle regions firing in different passes. Also, the print substrate is advanced at fractional increments of the print head width such that, only some nozzle regions are available to print at particular pixel locations during each swath. In addition, other nozzle regions are made available in subsequent passes.

It is also generally known to use masks to control the operation of print head nozzles during printing processes. The masks control which nozzles are to be fired, the location in the pattern they are to be fired, and in which passes the nozzles are to be fired. Typically, a particular set of mask may be chosen to correspond to a predetermined print mode. Known software tools may generate these masks via a mask generator. A set of masks may be used to control the nozzles of a print head during a printing pattern, with each mask controlling a single pass. When printing a repeating pattern, the use of a single set of constant masks may result in some of the print head nozzles being fired more than others.

Printing masks may be used to control the firing of nozzles regardless of the type of ink jet printing method employed. There are two commonly used technologies by which ink droplet ejection is achieved. These technologies are thermal (or bubble-jet) ink jet printing and piezo-electric (or impulse) ink jet printing. In thermal ink jet printing, the energy for ink drop ejection is generated by resistor elements, which are electrically heated. Such elements heat rapidly in response to electrical signals controlled by a microprocessor and creates a vapor bubble that expels ink through one or more jets associated with the resistor elements. In piezo-electric ink jet printing, ink drops are ejected in response to the vibrations of a piezo-electric crystal. The piezo-electric crystal responds to an electrical signal controlled by a microprocessor.

FIG. 1A illustrates an example of the usage frequency of nozzles in a conventional generic print head after printing a first of several repeated patterns using constant print masks. The print head 100 has nozzles $N_1$–$N_n$. A constant set of masks 105 controls the operation of the nozzles $N_1$–$N_n$ as described hereinabove. FIG. 1A also includes a histogram 110 that illustrates graphically the usage of nozzles $N_1$–$N_n$. As illustrated in the histogram 110, in printing the first of several patterns, nozzles $N_2$ and $N_7$ were most frequently used. Also according to the histogram 110, nozzles $N_1$ and $N_6$ were the least frequently used. Because a constant set of masks is used for the printing of each of the repeated patterns, the frequency of usage illustrated in the histogram 110 is substantially similar. Therefore FIG. 1A is representative of nozzle usage after each pattern is printed.

FIG. 1B illustrates an example of the frequency of nozzle usage in a conventional print head 100 after printing a second of several repeating patterns using constant print masks. Again the constant set of masks 105 control the operation of the nozzles $N_1$–$N_n$ as discussed hereinabove. FIG. 1B also includes a histogram 120 that graphically shows the compounded effect of continued use of the same set of constant masks 105 to control the firing of the print head nozzles $N_1$–$N_n$. Again, the nozzles $N_2$ and $N_7$ are the most frequently used and the nozzles $N_1$ and $N_6$ are the least frequently used. However, because the histogram 120 in FIG. 1B includes the usage after printing the first pattern in addition to the usage after printing the second pattern, the disparity between the more frequently fired nozzles $N_2$ and $N_7$ and the least frequently fired nozzles $N_1$ and $N_6$ is even greater than in FIG. 1A.

FIG. 1B also shows a failure line 130 to the right of the histogram 120. The failure line 130 represents the points at which each nozzle may fail because of over-use. As illustrated in FIG. 1B, continued printing with the constant set of masks 105 will result in the frequency of usage of the nozzles $N_2$ and $N_7$ approaching the failure line 130 sooner than that of the nozzles $N_1$ and $N_6$.

One disadvantage associated with the use of a constant set of print masks for printing repeating patterns is that some of the nozzles (the nozzles $N_2$ and $N_7$ for example) may be adversely stressed. For example, in thermal inkjet printers, the resistor elements associated with the adversely stressed nozzles may break down. In addition, in piezo-electric printers, the piezo-electric crystals associated with the adversely stressed nozzles may malfunction. Because overworked nozzles may malfunction, the printed patterns and the reliability of the print head may be compromised.

In addition, as stated hereinabove, the nozzles become inoperable with continued firing. When a certain percentage of the nozzles in a print head become inoperable, thereby exceeding a threshold percentage, the print head must be replaced to avoid deterioration in print quality. In printing repeating patterns with a constant set of masks, certain of the nozzles may become inoperable sooner than would be expected under nominal printing conditions. In this respect, as the rate of nozzle inoperability increases, the print heads must be replaced at a rate faster than would be expected under nominal printing conditions, thus requiring that additional print heads be used during the printing process. One result is that a user or operator must intervene to manually replace the print heads, thus reducing the overall efficiency of the printing process. Moreover, at least by virtue of the requirement of additional print heads, the overall costs in performing the printing operation may increase.

SUMMARY OF THE INVENTION

In accordance with one aspect, the invention pertains to a method for prolonging the life of a print head. The print head is used for printing a repeating pattern on a substrate. In this respect, the method includes the step of analyzing a repeating pattern. Additionally, in this respect, the method also includes the step of creating Z set(s) of print masks based on the results from the analysis of the repeating pattern.

According to another aspect, the present invention pertains to a method for printing a repeating pattern. In this respect, the method includes the steps of providing a print head with a plurality of nozzles. The method also includes the step of analyzing a repeating pattern. Based on the analysis of the repeating pattern, a set of masks that substantially balances the nozzle usage is created.

According to another aspect, the present invention pertains to a printer for printing a repeating pattern on a substrate. In this aspect the printer includes a print head with a plurality of nozzles. The printer also includes a controller for controlling print head functions including the firing of the print head nozzles. According to this aspect, the controller is configured to analyze the repeating pattern. The controller includes a mask generator operable to generate Z set(s) of masks. The masks are generated in response to the analysis of the repeating pattern.

In comparison to known prior art, certain embodiments of the invention are capable of achieving certain advantages, including some or all of the following: distributing workload more evenly among the print head nozzles; increasing print head life; improving printing efficiency; and reducing the costs associated with printing. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

FIG. 2C shows the cumulative frequency of nozzle usage after printing both the first pattern and the second pattern according to the first embodiment of the invention;

FIG. 4A illustrates the frequency of nozzle usage in a print head after printing a first pattern using data driven masks according to a second embodiment of the invention;

DETAILED DESCRIPTION OF THE PRESENT INVENTION

For simplicity and illustrative purposes, the principles of the present invention are described by referring mainly to exemplary embodiments thereof, particularly with references to an example of an inkjet printer device. However, one of ordinary skill in the art would readily recognize that the same principles are equally applicable to, and can be implemented in, any printer device that utilizes at least one nozzle to fire ink drops onto a substrate, and that any such variation would be within such modifications that do not depart from the true spirit and scope of the present invention.

Figure 1A:
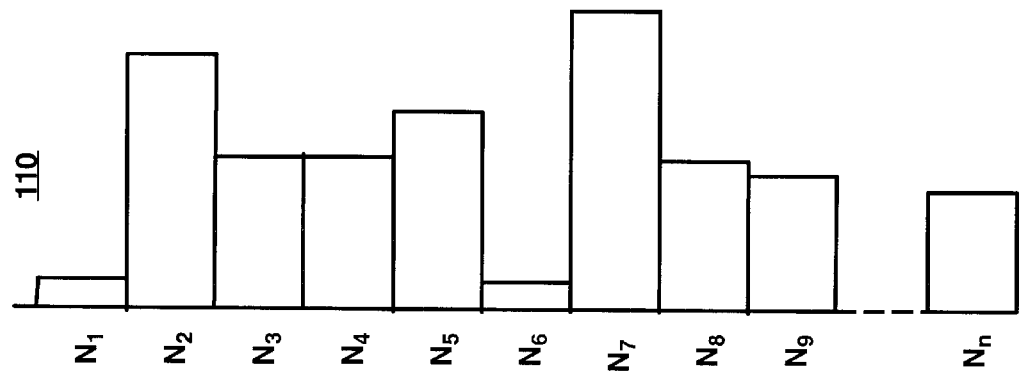
FIG. 1A illustrates an example of the frequency of nozzle usage in a conventional print head after printing a first pattern using constant print masks.
Figure 1A:
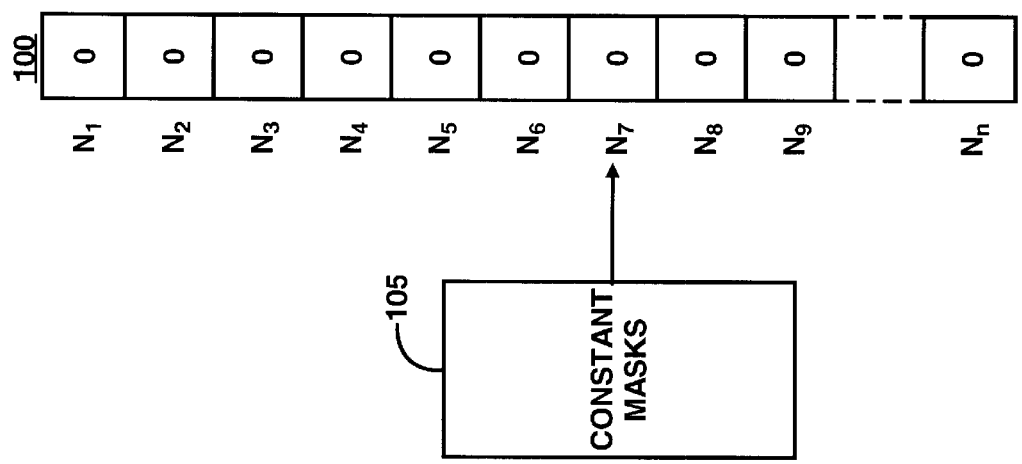
Figure 1B:
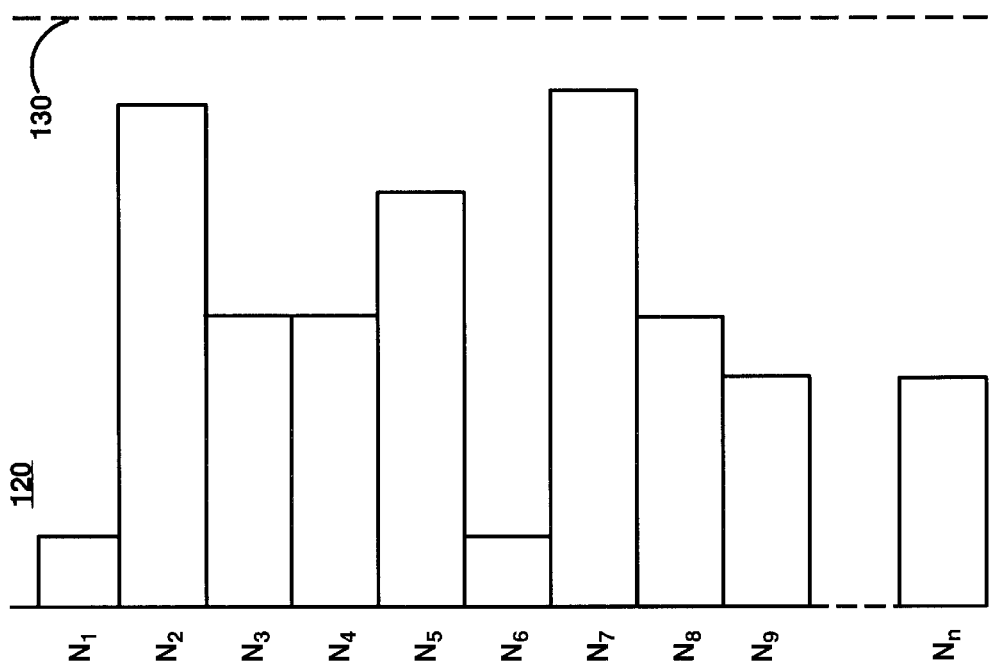
FIG. 1B illustrates an example of the frequency of nozzle usage in a conventional print head after printing a second pattern using constant print masks.
Figure 1B:
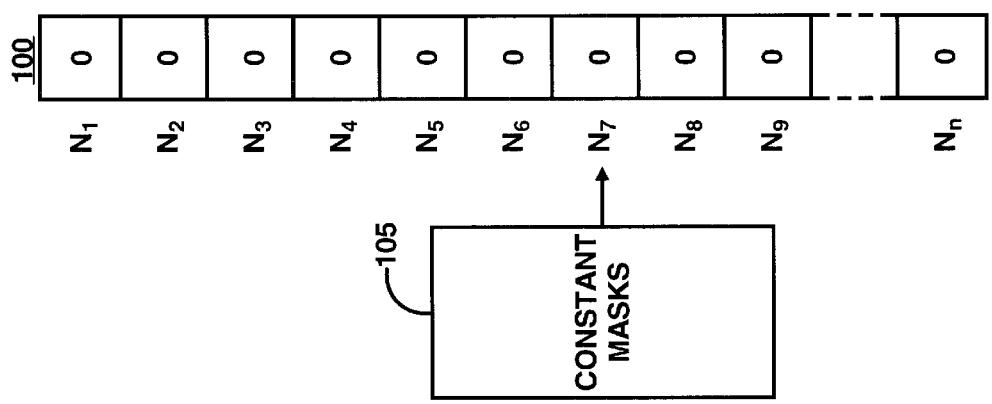
Figure 2A:
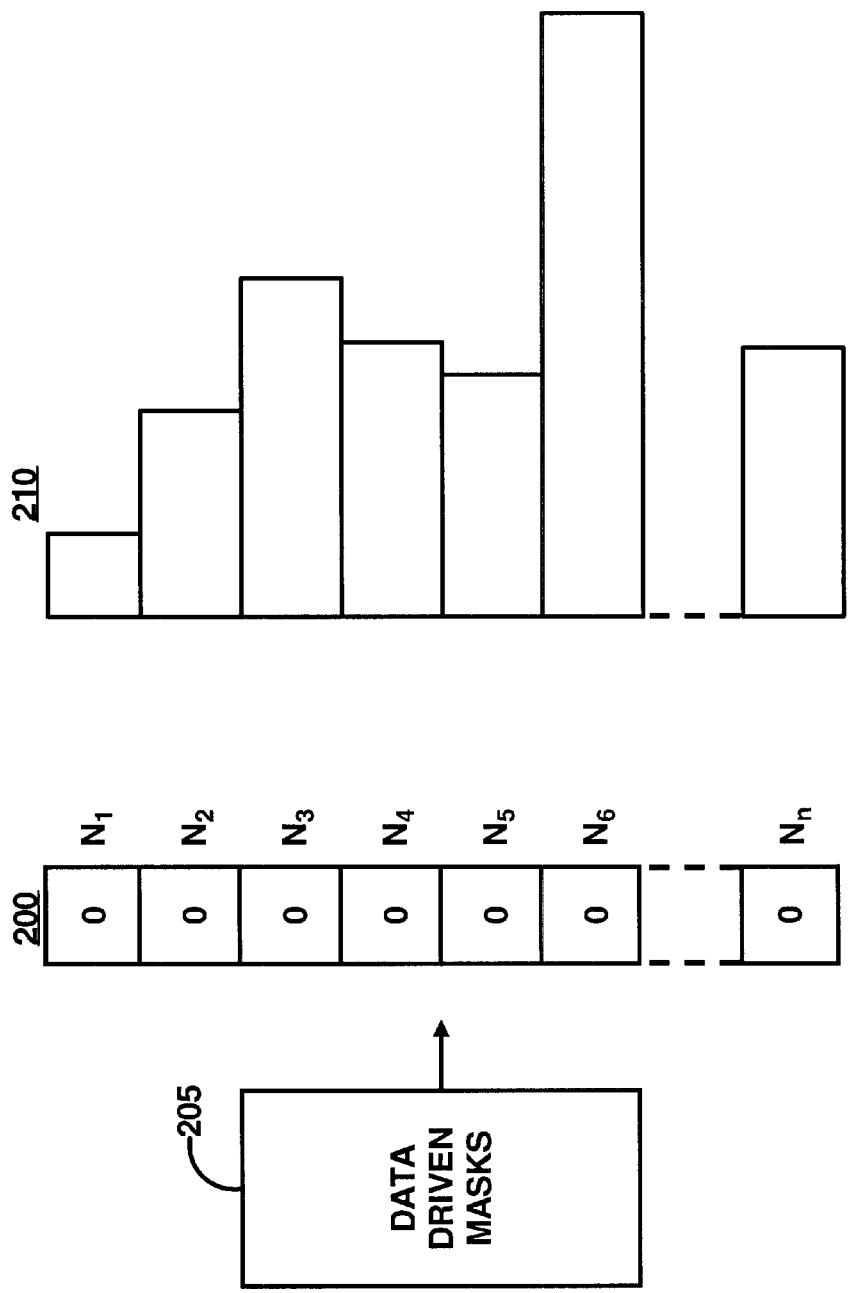
FIG. 2A illustrates an example of the frequency of nozzle usage in a print head after printing a first pattern using data driven masks according to a first embodiment of the invention.

FIG. 2A illustrates an example of the usage frequency of nozzles $N_1$–$N_n$ in a print head 200 after printing a first of several substantially similar patterns using data driven masks 205 according to the first embodiment of the invention. In this embodiment, a first set of masks is used to print the first of several substantially similar patterns. The first set of masks may be generated by conventional means. FIG. 2A includes a histogram 210 that illustrates the usage frequency of nozzles $N_1$–$N_n$ during the printing of the first pattern. As illustrated in the histogram 210, after printing the first pattern, nozzle usage is generally uneven for the nozzles $N_1$–$N_n$. The histogram 210 shows that the nozzles $N_3$ and $N_6$ are fired the most frequently during the printing of the first pattern, and the nozzles $N_1$ and $N_2$ are the least frequently fired.

Figure 2B:
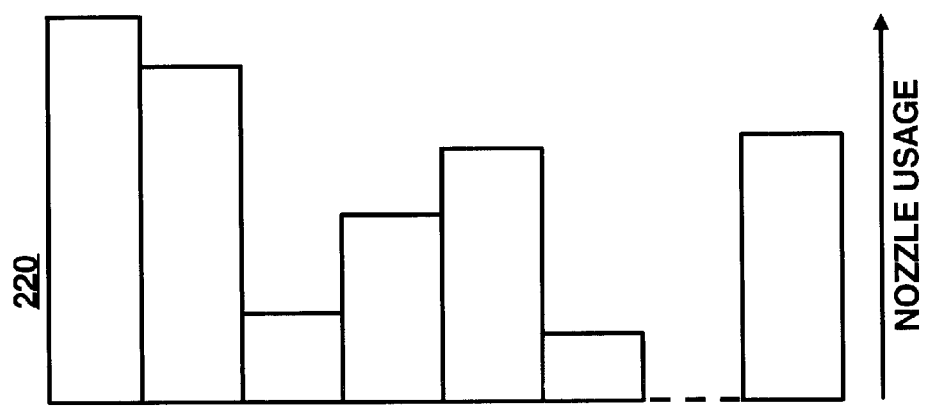
FIG. 2B illustrates an example of the frequency of nozzle usage in a print head during the printing of a second pattern using data driven masks according to the first embodiment of the invention.
Figure 2B:
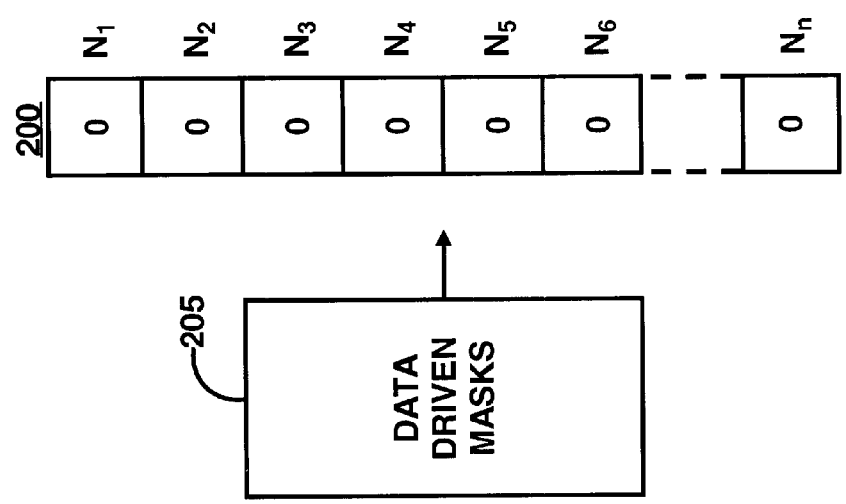

FIG. 2B illustrates the frequency of nozzle usage in a print head during the printing of a second pattern using the data driven masks 205 according to the first embodiment of the invention. At the end of the first pattern, the masks are changed to facilitate the substantial balancing of nozzle usage. This process may be enabled by the use of an algorithm that monitors the results of nozzle usage after the first pattern is printed. Based on these results, the algorithm may create a second set of masks that redistribute the workload. This may be accomplished with the use of an inversion formula. The second set of masks may be created to substantially balance the nozzle usage after a second pattern is printed.

In the redistribution of the workload, the newly created second set of masks may substantially invert the pattern of nozzle usage. This substantial inversion is illustrated in the histogram 220 of FIG. 2B which shows the frequency of nozzle usage during the printing of the second pattern. Ideally, the new masks would totally invert the nozzle usage. Due to operational constraints such as color accuracy, ink drying times, print modes, etc., the inversion is often times imperfect. Nonetheless, by accounting for these constraints, the nozzle usage may be substantially inverted. As a result of the substantial inversion, the least fired nozzles $N_1$ and $N_2$ for printing the first pattern are the most fired nozzles during the printing of the second pattern. Similarly, the most fired nozzles $N_3$ and $N_6$ during the printing of the first pattern are the least fired nozzles for the printing of the second pattern. The redistribution is such that, after the printing of the second pattern, the average usage of each nozzle $N_1$–$N_n$ is substantially the same.

FIG. 2C shows the cumulative frequency of nozzle usage after printing both the first pattern and the second pattern according to the first embodiment of the invention. FIG. 2C shows in a histogram 230 a substantially balanced nozzle usage after printing the first and second patterns. This is achieved because of the use of the data driven masks 205. It should be noted that after the second pattern is printed, the set of masks to be used for printing the third pattern is switched back to the original (first) set. Again, in order to substantially balance the usage of the nozzles $N_1$–$N_n$, the second set of masks may be implemented for the printing of the fourth pattern. Therefore, the first set of masks and the second set of masks may be stored in memory to be used for the subsequent printing of the repeating patterns. In this way, the set of masks may be alternated to achieve substantial balancing for the printing of an entire set of patterns.

FIG. 2C also illustrates a failure line 240 to the right of the histogram 230. The failure line 240 represents the points at which each nozzle may fail. By virtue of the substantial balancing of nozzle usage, all the nozzles $N_1$–$N_n$ approach their respective failure points at a substantially equal rate. This may prolong the life of the print head as a whole, thereby reducing the number of print heads required to perform the printing operations.

In a preferred embodiment, the printing of a first pattern may not be required in order to substantially balance the nozzle usage. The printer may include software that predetermines the first set of masks to be used for the printing of the first pattern. The first set of masks may be generated by conventional mask generating means. By virtue of the predetermining function, the printer software predetermines which nozzles are going to be used for printing the first of the repeating patterns. In effect, before the printer prints the first pattern, the printer software may preview the nozzle usage as illustrated in the histogram of FIG. 2A. Therefore, as illustrated in FIG. 2A, the software predetermine that the nozzles $N_3$ and $N_6$ will be fired the most frequently and the nozzles $N_1$ and $N_2$ will be the least frequently fired.

Based on the predetermined set of masks for the printing of the first pattern, the software may create a second set of masks for substantially balancing the nozzle usage. Here again, an inversion formula may be implemented to create a second set of masks for substantially balancing the nozzle usage. The nozzle usage resulting from the second set of masks may be similar to that illustrated in FIG. 2B. According to this preferred embodiment, both sets of masks are used to print the entire repeating pattern. The first and the second set of masks may be stored in memory to be used for the subsequent printing of the repeating patterns.

Figure 3:
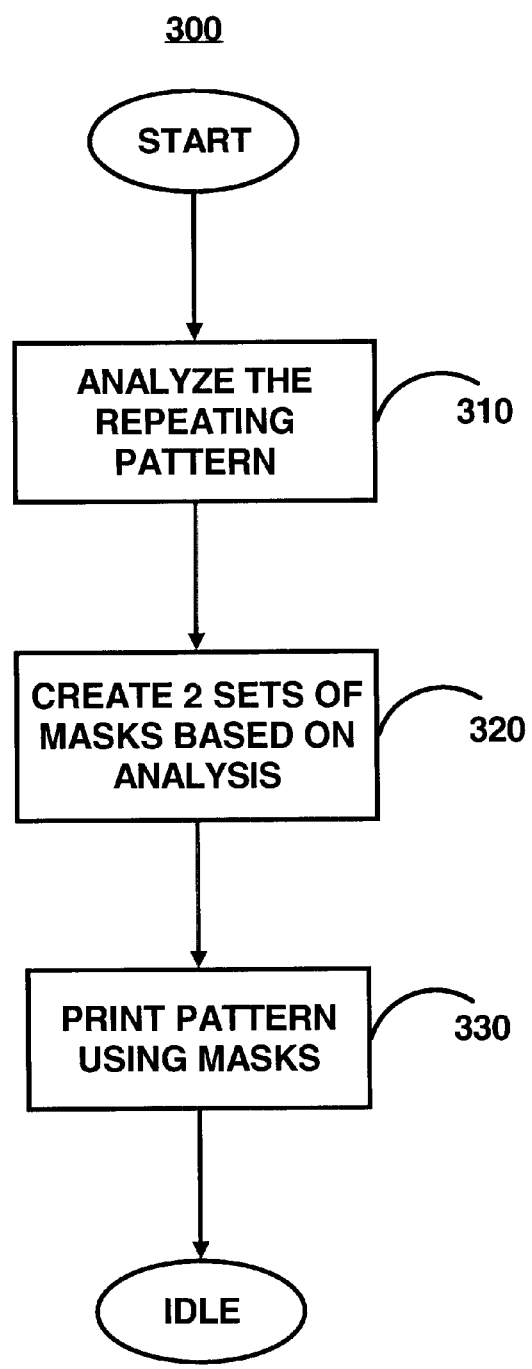
FIG. 3 is a flow chart showing a method for prolonging the life of a print head according to a first embodiment of the invention.

FIG. 3 is a flow chart showing a method 300 for prolonging the life of a print head according to the first embodiment of the invention. As stated above, this process involves the use of data driven masks. As illustrated in FIG. 3, at the beginning of the process, the repeating pattern is analyzed in step 310. At step 320 a second set of masks is created to substantially balance the nozzle usage based on the analyzed repeating pattern.

The analysis of the repeating pattern performed in step 310 may be accomplished in a variety of ways. For example, a first pattern of the plurality of repeating patterns may be printed using a first set of masks. The first set of masks may be generated by conventional mask generating means. The frequency of nozzle usage in printing the first pattern may be monitored and, at step 320, a second set of masks may be created to substantially balance the monitored nozzle frequency in a subsequent printing pass.

Another example for how the repeating pattern may be analyzed in step 310 is explained herein below. The procedure may not involve the actual printing of a first pattern. The printer may include software that predetermines the printing operations of a set of masks to be used in the printing of the first pattern. This set of masks may be created by conventional means. By this predetermining function, the software may determine the frequency of usage of nozzles $N_1$–$N_n$ for printing the first pattern without actually printing the first pattern. Then at step 320, the second set of masks is created to substantially balance the predetermined nozzle usage.

In the creating step 320, an algorithm may be used to create the set of masks to substantially balance the nozzle $N_1$–$N_n$ usage. The algorithm may take into account the actual or previewed nozzle usage for the printing of the first pattern, and may also analyze the next substantially similar pattern to be printed. The second set of masks may be created by implementing inversion equations for substantially inverting the pattern of usage of the nozzles.

Step 330 is the actual printing of the repeating pattern using the two sets of masks. The two sets of masks may be used in alternating fashion to continuously balance the nozzle usage for the printing of the repeating pattern. After they are created, the two sets of masks are stored in memory so that they may be used for the printing of the subsequent repeating patterns. Therefore the first set and the second set of masks are used in alternating fashion until no more repeating patterns are required. Then, the process enters an idle state.

In the method 300, a change in the feeding rate of the substrate may also be used to assist with the substantial balancing of nozzle usage. The substrate feeding rate may be increased or decreased to make it relatively easier to have a predetermined nozzle substantially aligned with a desired printing position on the substrate. By varying the feeding rate, different nozzles are made available to fire ink drops. Therefore, different options from those available with a constant media advance rate may be made available. The feeding rate change in combination with the use of a specific set of masks that correspond to the feeding rate, is an option that may further contribute to the substantial balancing of nozzle usage.

FIG. 4A illustrates the frequency of nozzle $N_1$–$N_n$ usage in a print head 400 after printing a first of several substantially similar patterns using data driven masks 405 according to a second embodiment of the invention. In this embodiment, a first single set of masks is used to print the first of several substantially similar patterns. The first set of masks may be generated by conventional mask generating means. FIG. 4A includes a histogram 410 that illustrates the frequency of nozzle usage during the printing of the first pattern. As illustrated in the histogram 410, after printing the first pattern, the nozzle usage is uneven for the nozzles $N_1$–$N_n$. The histogram 410 shows that the nozzles $N_3$ and $N_6$ are fired the most frequently during the printing of the first pattern, and the nozzles $N_1$ and $N_2$ are the least frequently fired.

Figure 4B:
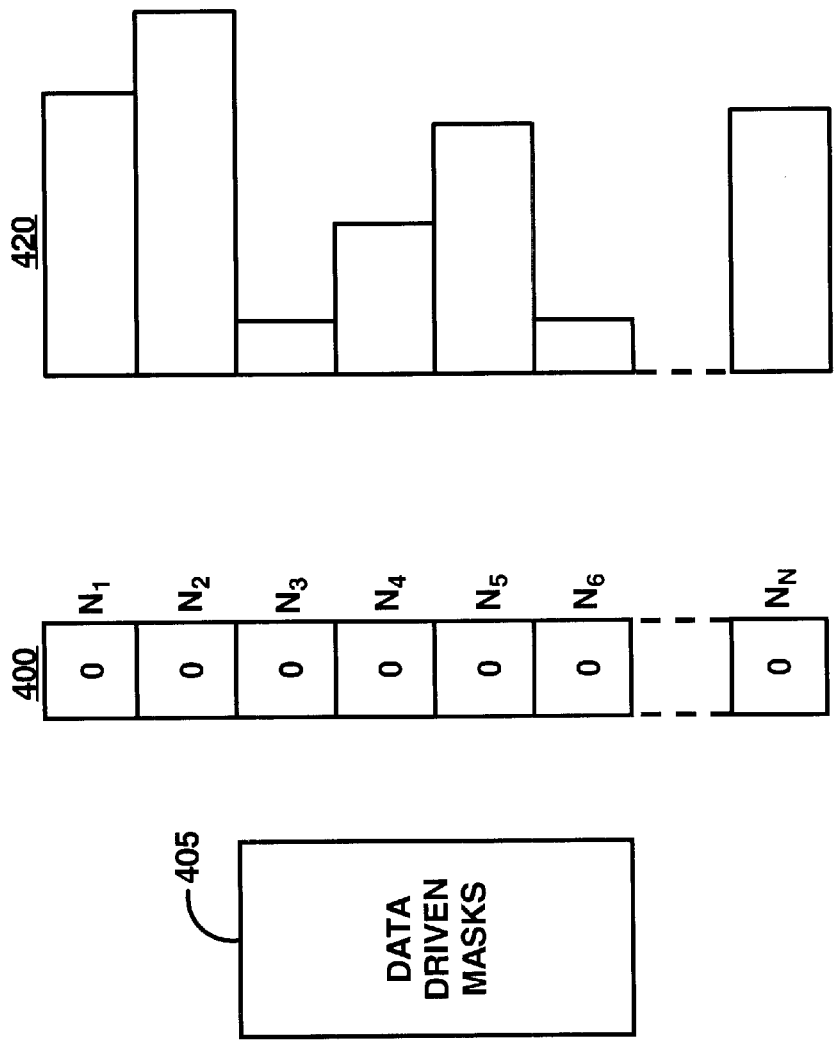
FIGS. 4B–4D illustrate the frequency of nozzle usage in a print head during the printing of a second, third, and fourth pattern using data driven masks according to the second embodiment of the invention.
Figure 4C:
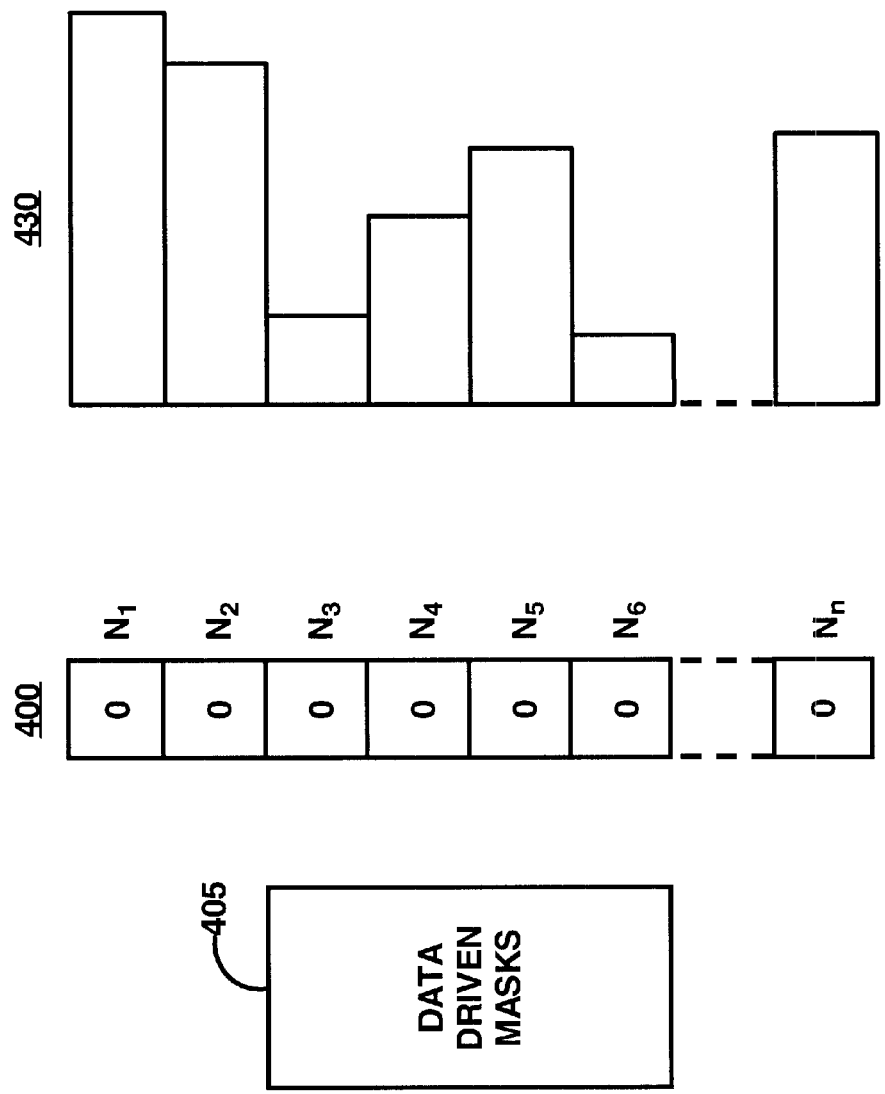
Figure 4D:
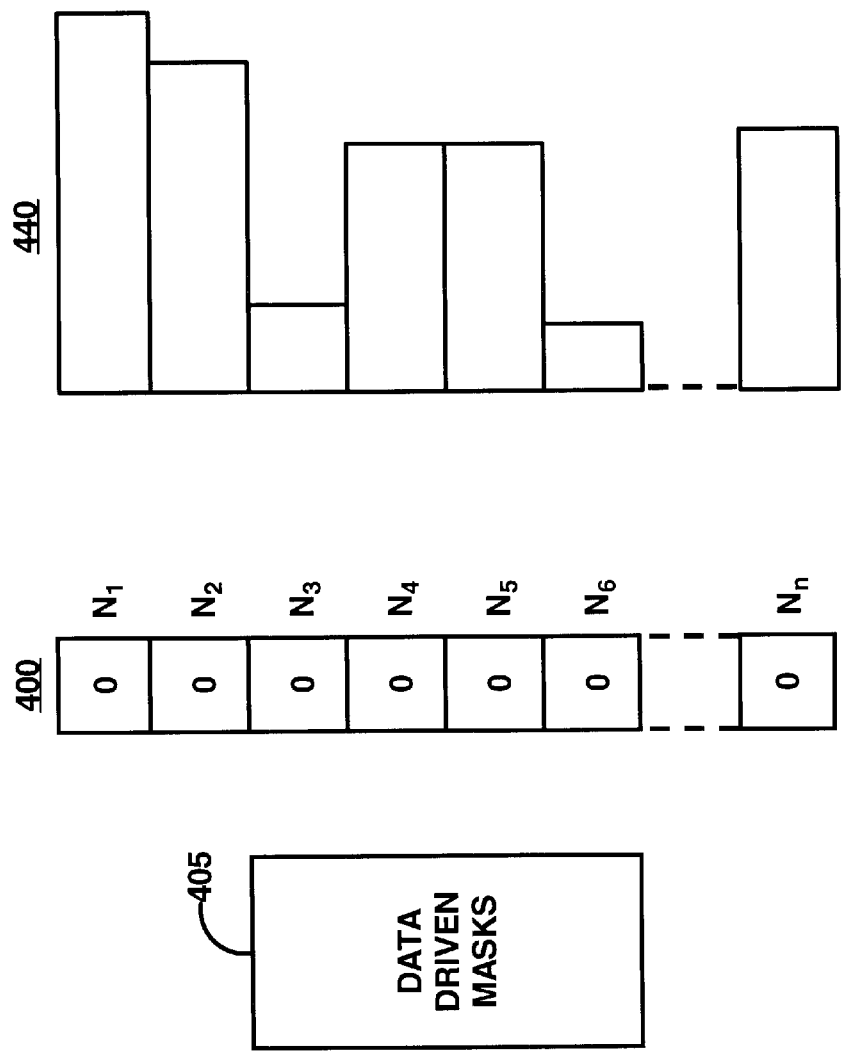

FIGS. 4B, 4C, and 4D illustrate the frequency of nozzle usage in a print head during the printing of a second, third, and fourth pattern, respectively, using data driven masks 405 according to the second embodiment of the invention. At the end of the printing of the first pattern, the masks may be changed to facilitate a substantial balancing of nozzle $N_1$–$N_n$ usage. This process is enabled by the use of an algorithm that may monitor the results of nozzle usage after the first pattern is printed. Based on these results, the algorithm creates a plurality of sets of masks that may redistribute the workload. The plurality of sets of masks may be created to substantially balance the nozzle usage after a plurality of patterns are printed. The second embodiment of the invention therefore varies from the first embodiment, which substantially balances nozzle $N_1$–$N_n$ usage after the printing of a single additional pattern.

In the redistribution of the workload, the newly created groups of mask sets may substantially invert the pattern of nozzle $N_1$–$N_n$ usage. This may be accomplished with the use of an inversion formula. As stated before, because of operational constraints such as color accuracy, ink drying times, print modes, etc., the inversion may not be perfect. However, by accounting for these constraints, the nozzle usage is substantially inverted. The substantial inversion is illustrated in the histograms 420, 430, and 440 of FIGS. 4B, 4C, and 4D respectively, which show the frequency of nozzle $N_1$–$N_n$ usage during the printing of the second pattern. The inverting procedure balances the nozzle usage over a period that may last over the printing of a plurality of patterns. FIGS. 4B, 4C, and 4D show this balancing procedure being carried out during the printing of the second, third, and fourth patterns. The nozzle usage illustrated in the histograms of these figures shows variations in nozzle usage. As a result of this inversion, the least fired nozzles $N_1$ and $N_2$ for printing the first pattern may be the most fired nozzles during the printing of the second, third, and fourth patterns. Similarly, the most fired nozzles $N_3$ and $N_6$ during the printing of the first pattern may be the least fired nozzles for the printing of the second, third, and fourth patterns. The redistribution is such that, after the printing of the fourth pattern, the usage of each nozzle $N_1$–$N_n$ is substantially the same. As opposed to the first embodiment, the nozzle balancing procedure of the second embodiment occurs more gradually.

Figure 4E:
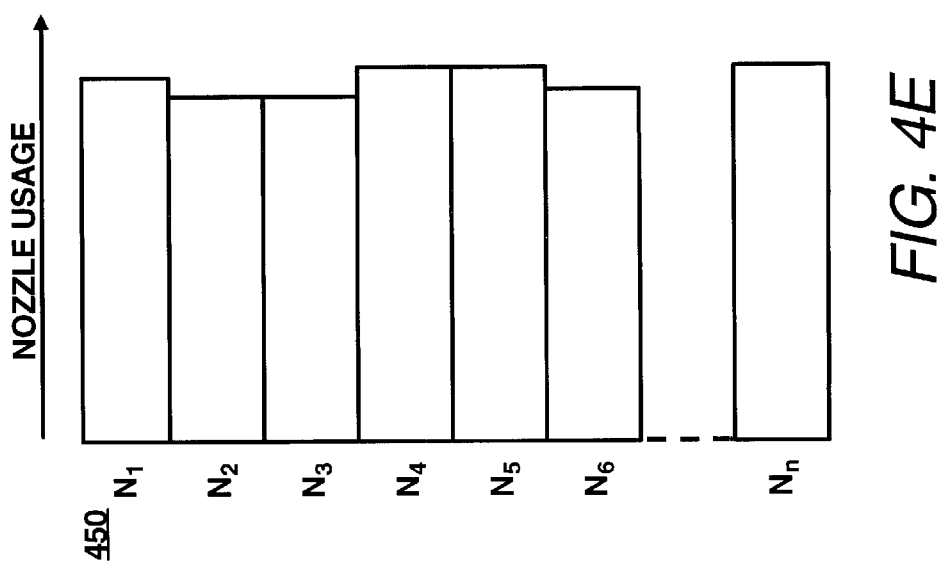
FIG. 4E shows the cumulative frequency of nozzle usage after printing all four patterns according to the second embodiment of the invention.

FIG. 4E shows the cumulative frequency of nozzle usage after printing the first, second, third, and fourth patterns according to the second embodiment of the invention. FIG. 4E shows in a histogram 450, a substantially balanced nozzle usage after printing all four patterns. This is achieved because of the use of the data driven masks 405. It should be noted that although FIGS. 4A–4E show the substantial nozzle balancing occurring after four patterns are printed, but the substantial balancing may be accomplished over any reasonable suitable number of patterns. For example, the balancing may be done after printing three patterns or ten patterns, etc. The number of sets of masks used in the balancing process may depend on the level of balancing required. For example, depending on the pattern, two sets of masks may produce about 40% balancing, whereas for that same pattern, fifteen sets of masks may produce 80% balancing. Other factors affecting the number of sets of masks chosen may include the number of printing passes required for a particular print mode. Yet another factor affecting the number of masks is the feeding rate of the substrate, which is discussed in a section below.

It should also be noted that after the substantial balancing is achieved, if more patterns are required to be printed, the system may restart by using the original set of masks followed by the group of masks. All of the masks used may be stored in memory so that they may be easily re-used without additional calculations. These mask sets may be used as often as required to achieve substantial balancing for the printing of all of the repeating patterns.

In a preferred embodiment, the printing of a first pattern may not be required in order to substantially balance the nozzle usage. The printer may include software that predetermines the first set of masks to be used for the printing of the first pattern. The first set of masks may be generated by conventional mask generating means. Because of this predetermining function, the printer software knows which nozzles are going to be used for printing the first of the repeating patterns. In effect, before the printer prints the first pattern, the printer software predetermines the nozzle usage illustrated in FIG. 4A. Therefore as illustrated in FIG. 4A, the software previews the nozzles $N_3$ and $N_6$ being fired the most frequently and the nozzles $N_1$ and $N_2$ being the least frequently fired.

Based on the predetermined set of masks for the printing of the first pattern, the software creates a plurality of sets of masks for substantially balancing the nozzle $N_1$–$N_n$ usage.

Again here, an inversion formula may be used to create the sets of masks for substantially balancing the nozzle $N_1$–$N_n$ usage. It should be noted that the substantial balancing may be accomplished over any reasonably suitable number of patterns. As stated before, the number of sets of masks used in the balancing process may depend on the level of balancing required, the type of print mode used, or the feeding rate of the substrate. According to this preferred embodiment, the plurality of sets of masks are used to print all of the repeating patterns. The sets of masks may be stored in memory to be used for the subsequent printing of the repeating patterns.

In yet another preferred embodiment, the printing of a first pattern may not be required in order to substantially balance the nozzle usage. The printer may include software that recognizes the repeating pattern and the requirements for printing this repeating pattern. The pattern may be analyzed and recognition is made regarding the number of drops per nozzle that must be fired per row of the repeating pattern. Based on the recognition of the repeating pattern, and information regarding operational constraints, the software may create a plurality of sets of masks for printing the entire repeating pattern. Iterative equations may be used to formulate the sets of masks that produce substantially balanced nozzle usage for a period that spans the printing of a plurality of the repeating patterns. As with the above embodiments, the plurality of sets of masks may be stored in memory to be used for the subsequent printing of the repeating patterns. It should be noted that the substantial balancing may be accomplished over any reasonably suitable number of patterns. For example, the balancing may be done after printing two patterns or twelve patterns, etc. As stated before, the number of sets of masks used in the balancing process may depend on the level of balancing required, the print mode used, or the feeding rate of the substrate.

Figure 5:
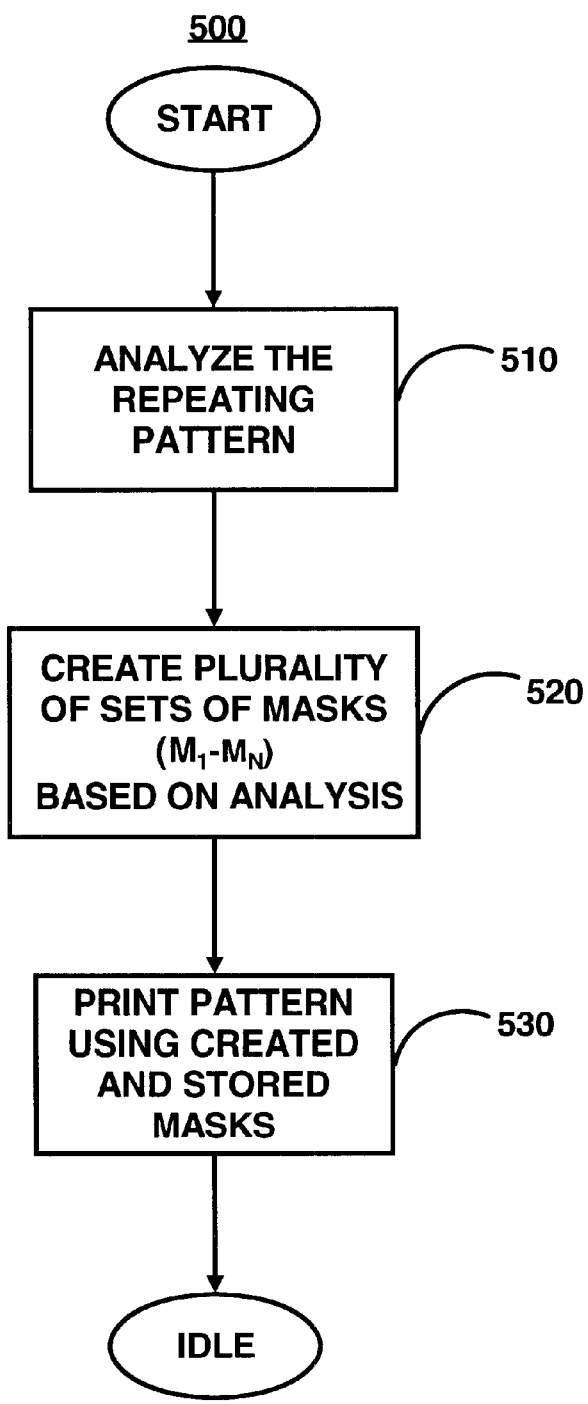
FIG. 5 is a flow chart showing a method for prolonging the life of a print head according to a second embodiment of the invention.

FIG. 5 is a flow chart showing a method 500 for prolonging the life of a print head according to a second embodiment of the invention. As illustrated in FIG. 5, at the beginning of the method 500, the repeating pattern is analyzed in step 510. At step 520 a plurality of sets of masks $M_1$–$M_N$ are created to substantially balance the nozzle usage. The plurality of sets of masks $M_1$–$M_N$ are created based on the analysis of step 510.

The analysis of the repeating pattern performed in step 510 may be accomplished in several ways. For example, a first pattern of the plurality of repeating patterns may be printed using a first set of masks. The first set of masks may be generated by conventional mask generating means. The process for the printing of the first pattern is monitored to determine the frequency of nozzle usage. Then at step 520, the plurality of sets of masks $M_1$–$M_N$ are created to substantially balance the nozzle usage. This balancing takes place over the printing of a plurality of the repeating patterns.

Another example for how the repeating pattern may be analyzed in step 510 is explained herein below. The procedure may not involve the actual printing of a first pattern. The printer may include software that predetermines the printing operation of a set of masks to be used in the printing of the first pattern. This first set of masks may be created by conventional means. By the predetermining function, the software may determine the frequency of nozzle usage for printing the first pattern without actually printing the first pattern. Then at step 520, the plurality of sets of masks $M_1$–$M_N$ are created to substantially balance the predetermined nozzle usage. The substantial balancing takes place over the printing of a plurality of the repeating patterns.

In the creating step 520, an algorithm may be used to create the plurality of sets of masks $M_1$–$M_N$ to substantially balance the nozzle $N_1$–$N_n$ usage. The algorithm may take into account the actual or previewed nozzle usage for the printing of the first pattern, and also may analyze the next substantially similar pattern to be printed. The plurality of sets of masks $M_1$–$M_N$ may be created by implementing inversion equations for substantially inverting the pattern of usage of the nozzles.

Step 530 is the actual printing of the repeating pattern using all the created sets of masks. In the embodiments in which a first set of masks (that may be conventionally created) is involved in the creation of the plurality of masks, then the plurality of sets of masks $M_1$–$M_N$ are used in sequential fashion together with the first set of masks. For instance, after printing the first pattern using the first set of masks, masks $M_1$ may be used to print the second pattern. Masks $M_2$ may be used to print the third pattern and masks $M_3$ may be used to print a fourth pattern. This process continues until mask $M_N$ is used. After the final set of masks $M_N$ is used, a substantially balanced nozzle usage is achieved. In the embodiment in which the plurality of sets of masks $M_1$–$M_N$ are created without using a first set of masks, then only the plurality of sets of masks $M_1$–$M_N$ are used. After they are created, all the masks are stored in memory so that they may be used for the printing of the subsequent repeating patterns. Thereafter the stored sets of masks may be used sequentially until no more repeating patterns are required. Then, the process enters an idle state.

In the method 500, in addition to the use of a plurality of sets of masks to balance the nozzle usage, a change in the feeding rate of the substrate may also be applied. The substrate feeding rate may be increased or decreased to make it relatively easier to have a predetermined nozzle substantially aligned with a desired printing position on the substrate. By varying the feeding rate, different nozzles are made available to fire ink drops. Therefore, different options from those available with a constant media advance rate may be made available. The feeding rate change in combination with the use of a plurality of sets of masks that correspond to a particular feeding rate is an option that may further contribute to the substantial balancing of nozzle usage.

In another variation of the method 500, a group of substantially similar sets of masks may be created for substantially balancing the nozzle usage. This plurality of sets of masks created in this variation is different because each individual set of masks may be substantially similar to the other sets of masks created. In other words, each of the plurality of sets of masks triggers substantially similar nozzle usage during the printing of each pattern. In this method, again the substantial balancing may take place after printing several patterns subsequent to the first printed pattern.

To generalize the methods 300 and 500, they both may produce substantially balanced nozzle usage. Both methods 300 and 500 may analyze the repeating pattern. As a result of the analysis of the repeating pattern, Z sets of masks may be created. The Z sets of masks may be used to substantially balance the nozzle usage. In method 300, Z=1. In method 500, Z>1. Method 300 may substantially balance the nozzle use in a single printing job subsequent to the printing of the first pattern. Method 500 may substantially balance the nozzle usage after printing a plurality of patterns subsequent to the printing of the first pattern.

Figure 6:
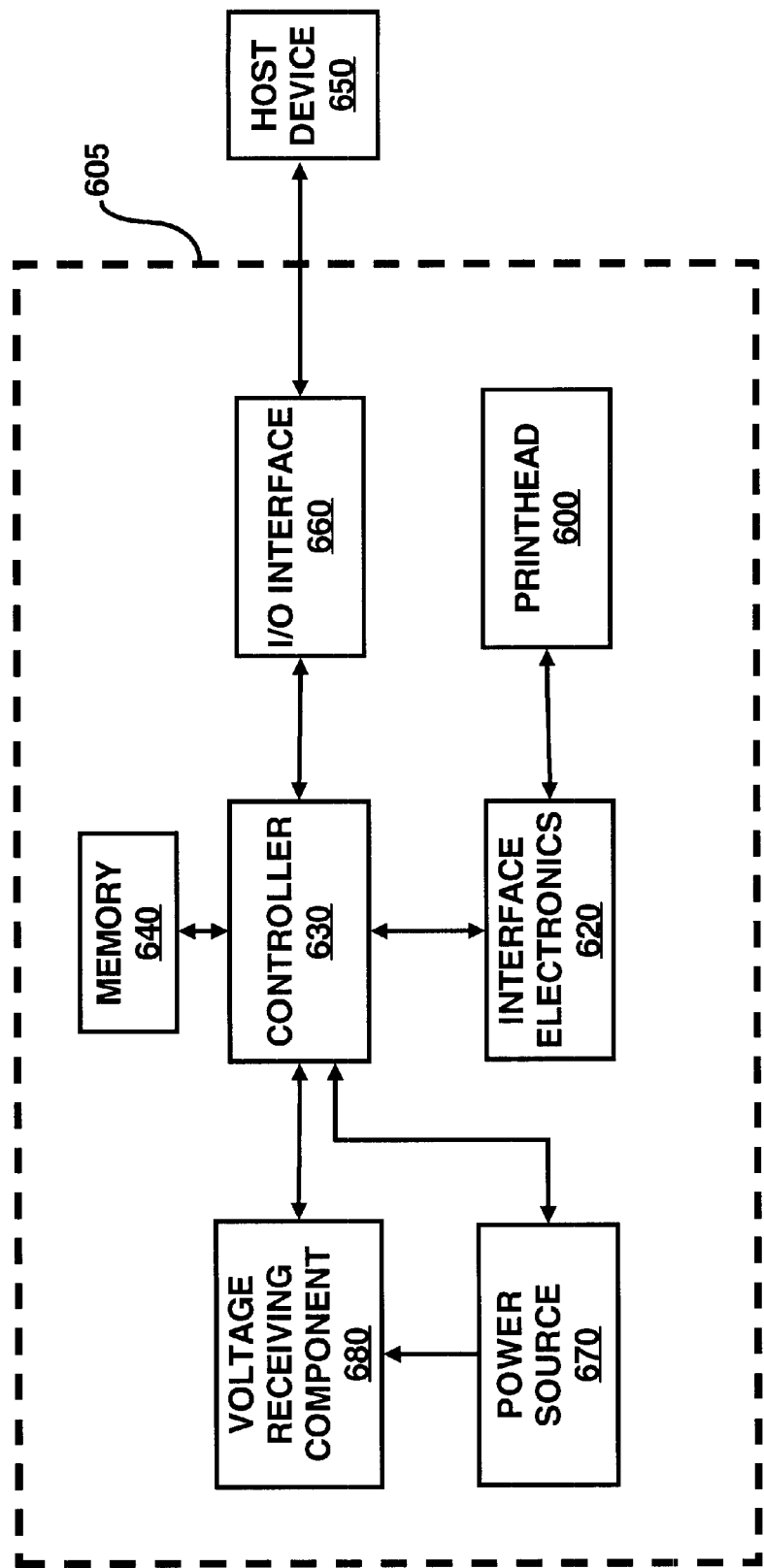
FIG. 6 is an exemplary block diagram of a printer in accordance with the principles of the present invention.

Referring to FIG. 6, an exemplary block diagram of a printer 605 in accordance with the principles of the present invention is illustrated. As will become better understood from a reading of the present disclosure, the following description of the block diagram of FIG. 6 illustrates one manner in which an inkjet printer 605 for printing a repeating pattern may be operated. In this respect, it is to be understood that the following description is but one manner of a variety of different manners in which such an inkjet printer may be operated.

As shown in FIG. 6, the printer 605 includes a plurality of elements, including a print head 600. The print head 600 is configured to repeatedly pass across a substrate in individual, horizontal swaths or passes during a printing operation to print repeating patterns onto the substrate. The print head 600 is configured to contain a plurality of nozzles $N_1$–$N_n$ (not shown), which are operable to be implemented during each pass to apply an ink pattern onto the substrate.

As also illustrated in FIG. 6, the printer 605 also includes interface electronics 620. The interface electronics 620 may be configured to provide an interface between a controller 630 of the printer 610 and the components for moving the print head 600, e.g., a carriage, belt and pulley system (not shown), etc. According to the invention, the controller 630 may include a counter and mask generator for controlling the firing of individual nozzles $N_1$–$N_n$. The controller 630 may also include, circuits for moving the substrate and for changing the rate at which the substrate is fed through the printing zone. The controller 630 may also include circuits to control the movement of the print head 600, the medium, and the like.

The controller 630 may be configured to provide control logic for the printer 605, which provides the functionality for the printer. In this respect, the controller 630 may possess a microprocessor, a micro-controller, an application specific integrated circuit, and the like. The controller 630 may be interfaced with a memory 640 configured to provide storage of computer software that provides the functionality of the printer 605 and may be executed by the controller 630. The memory 640 may include software configured to preview or predetermine printing operations before they actually take place. The memory 640 may also be configured to provide a temporary storage area for data/file received by the printer 605 from a host device 650, such as a computer, server, workstation, and the like. The memory 640 may be implemented as a combination of volatile and non-volatile memory, such as dynamic random access memory ("RAM"), EEPROM, flash memory, and the like. It is also within the purview of the present invention that the memory 640 may be included in the host device 650.

The controller 630 is further interfaced with an I/O interface 660 configured to provide a communication channel between a host device 408 and the printer 610. The I/O interface may conform to protocols such as RS-232, parallel, small computer system interface, universal serial bus, etc. In addition, the controller 630 is interfaced with a voltage-receiving component 680, such as a vacuum fan, motors, piezoelectric components, etc., to control its operation. Also, the controller 630 is interfaced with a power source 670 configured to supply voltage to the voltage-receiving component 680.

Figure 7:
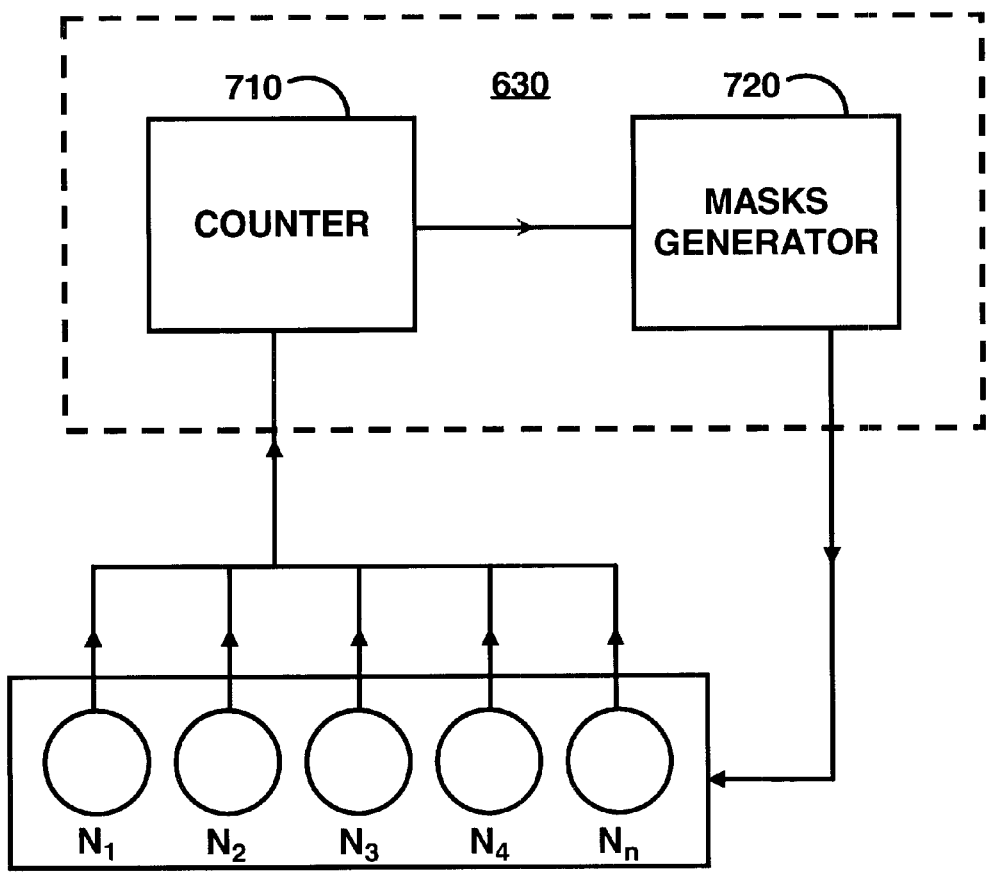
FIG. 7 is a schematic illustration of the inter-operation between the print head and the controller illustrated in FIG. 6.

FIG. 7 is a schematic illustration of the inter-operation between the print head 600, the controller 730. As illustrated, the counter 710 and the mask generator 720 are both elements of the controller 630. FIG. 7 also shows the print head 600 with nozzles $N_1$–$N_n$. The counter 710 is electrically attached to the print head 600. The counter 710 may count the number of times that each nozzle is used while printing the first pattern. The results gathered by the counter 710 may be sent to the masks generator 720. The mask generator 720 has firmware that uses the information from the counter 710 and information about the repeating pattern. This information may be used to generate Z sets of masks. The Z sets of masks may be generated to substantially balance the nozzle usage.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A method for prolonging the life of a print head having a plurality of nozzles, the print head being configured to print a repeating pattern on a substrate, the method comprising:
    creating a Z set(s) of print masks;
    selecting at least one print mask from said Z set(s) of print masks;
    analyzing a repeating pattern in said at least one print mask; and
    utilizing said changed Z sets of print masks to control the firing of at least one of said plurality of nozzles, and
    changing said Z set(s) of print masks based on the results from the analyzing step.

2. The method of claim 1, wherein the step of analyzing the repeating pattern comprises:
    printing a first pattern; and
    monitoring the printing of the first pattern.

3. The method of claim 2, wherein the step of monitoring the printing of the first pattern comprises counting the number of times each print head nozzle is used during the printing of the first pattern.

4. The method of claim 3, wherein Z=1.

5. The method of claim 4, wherein the step of creating one set of print masks comprises creating print masks that substantially balance the number of times each nozzle is used.

6. The method of claim 5, wherein the created print masks substantially balance the number of times each nozzle is used after the printing of a second pattern.

7. The method of claim 1, wherein the step of analyzing the repeating pattern comprises predetermining the number of times each nozzle is to be fired during the printing of a first pattern.

8. The method of claim 7, wherein Z=1.

9. The method of claim 8, wherein the step of creating one set of print masks comprises creating print masks that substantially balance the number of times each nozzle is used.

10. The method of claim 9, wherein the created print masks substantially balance the number of times each nozzle is used after the printing of a second pattern.

11. The method of claim 3, wherein Z>1.

12. The method of claim 11, wherein the step of creating more than one set of print masks comprises creating print masks that substantially balance the number of times each nozzle is used.

13. The method of claim 12, wherein the created print masks substantially balance the number of times each nozzle is used, after printing a plurality of patterns subsequent to the printing of the first pattern.

14. The method of claim 13, wherein the balancing of the number of times each nozzle is used further comprises the steps of switching from one of the more than one set of print masks to another of the more than one set of print masks.

15. The method of claim 14 wherein each of the more than one sets of masks created triggers a substantially similar nozzle usage for the subsequent printing of the repeating pattern.

16. The method of claim 1, further comprising the step of changing the rate at which the substrate is advanced.

17. The method of claim 1, wherein the step of analyzing the repeating pattern comprises recognizing the repeating pattern.

18. A method for printing a repeating pattern, the method comprising the steps:
    providing a print head with a plurality of nozzles;
    analyzing the repeating pattern; and
    creating a set of masks that substantially balances the nozzle usage in response to the analysis of the repeating pattern.

19. The method of claim 18, wherein the single set of masks substantially balances the nozzle usage after printing a second pattern.

20. The method of claim 19 further comprising the step of creating at least a second set of masks based on the analysis of the first pattern.

21. The method of claim 20 wherein the sets of masks substantially balance the nozzle usage after printing a plurality of patterns.

22. The method of claim 21, wherein each of the sets of masks created triggers a substantially similar nozzle usage for the subsequent printing of the repeating pattern.

23. The method of claim 20, further comprising:
    altering the speed at which the substrate is fed in order to assist with the substantial balancing of nozzle usage.

24. A printer for printing a repeating pattern on a substrate, the printer comprising:
    a print head with a plurality of nozzles,
    a controller for controlling print head functions including the firing of the print head nozzles, wherein the controller is configured to analyze the repeating pattern, the controller comprising;
    a mask generator operable to generate Z set(s) of masks, in response to the analysis of the repeating pattern.

25. The printer of claim 24 wherein the controller further comprises a counter for analyzing the repeating pattern by counting the number of occurrences that each of the print head nozzles is fired.

26. The printer of claim 24 wherein the controller further comprises software for analyzing the repeating pattern by previewing the number of occurrences that each of the print head nozzles would be fired.

27. The printer of claim 24 wherein the controller further comprises software for analyzing the repeating pattern by recognizing the requirements for printing the repeating pattern.

28. The printer of claim 24 wherein Z=1.

29. The printer of claim 24 wherein Z>1.

30. The printer of claim 24 wherein the controller is further configured to change the feeding rate of the substrate.

31. A method for prolonging the life of a print head having a plurality of nozzles, the print head being configured to print a repeating pattern on a substrate, the method comprising the steps of:

printing a first pattern;

monitoring the printing of the first pattern;

analyzing said first pattern for a repeating pattern; and creating Z set(s) of print masks based on the results from the analyzing step, wherein the step of creating one set of print masks comprises creating print masks that substantially balance the number of times each nozzle is used.

32. A method for prolonging the life of a print head having a plurality of nozzles, the print head being configured to print a repeating pattern on a substrate, the method comprising the steps of:

printing a first pattern and a second pattern;

monitoring the printing of the first pattern and second pattern;

analyzing said first pattern and second pattern for a repeating pattern; and creating Z set(s) of print masks based on the results from the analyzing step, wherein the step of creating Z set(s) of print masks comprises creating print masks that substantially balance the number of times each nozzle is used after printing of the first pattern and the created print masks substantially balance the number of times each nozzle is used after a printing of the second pattern.

33. A method for printing a repeating pattern, the method comprising the steps of:

providing a print head with a plurality of nozzles;

printing a first pattern with the printhead, the first pattern including a repeating pattern;

analyzing the repeating pattern; and creating a set of masks that substantially balances nozzle usage for the plurality of nozzles in response to the analysis of the repeating pattern, wherein the single set of masks substantially balances the nozzle usage after printing a second pattern.

34. A method for printing a repeating pattern, the method comprising the steps of:

providing a print head with a plurality of nozzles;

printing a first pattern with the printhead, the first pattern including a repeating pattern;

analyzing the repeating pattern;

creating a set of masks that substantially balances nozzle usage for the plurality of nozzles in response to the analysis of the repeating pattern, wherein the set of masks substantially balances the nozzle usage after printing a second pattern; and creating at least a second set of masks based on the analysis of the second pattern.

35. A method for printing a repeating pattern, the method comprising the steps of:

providing a print head with a plurality of nozzles;

printing a first pattern with the printhead, the first pattern including a repeating pattern;

analyzing the repeating pattern;

creating a set of masks that substantially balances nozzle usage for the plurality of nozzles in response to the analysis of the repeating pattern, wherein the set of masks substantially balances the nozzle usage after printing a second pattern; and creating at least a second set of masks based on the analysis of the second pattern, wherein the sets of masks substantially balance the nozzle usage after printing a plurality of patterns.

36. A method for printing a repeating pattern, the method comprising the steps of:

providing a print head with a plurality of nozzles;

printing a first pattern with the printhead, the first pattern including a repeating pattern;

analyzing the repeating pattern;

creating a set of masks that substantially balances nozzle usage for the plurality of nozzles in response to the analysis of the repeating pattern, wherein the set of masks substantially balances the nozzle usage after printing a second pattern; and creating at least a second set of masks based on the analysis of the second pattern, wherein each of the sets of masks triggers substantially similar nozzle usage for the subsequent printing of the repeating pattern.

37. A method for printing a repeating pattern, the method comprising the steps of:

providing a print head with a plurality of nozzles;

printing a first pattern with the printhead, the first pattern including a repeating pattern;

analyzing the repeating pattern;

creating a set of masks that substantially balances nozzle usage of the plurality of nozzles in response to the analysis of the repeating pattern, wherein the set of masks substantially balances the nozzle usage after printing a second pattern;

creating at least a second set of masks based on the analysis of the second pattern; and altering a speed at which the substrate is fed in order to assist with substantial balancing of nozzle usage.

38. A printer for printing a repeating pattern on a substrate, the printer comprising:

a print head with a plurality of nozzles;

a controller for controlling print head functions including the firing of the plurality of nozzles, wherein the controller is configured to analyze a repeating pattern created by the printhead, the controller comprising:

a mask generator operable to generate Z set(s) of masks based on an analysis of the repeating pattern; and software for analyzing the repeating pattern by recognizing requirements for printing the repeating pattern.

* * * * *